2,938,024
Patented May 24, 1960

2,938,024

DYESTUFFS CONTAINING BOTH AZO-CHROMOPHORES AND QUINONE CHROMOPHORES

Jakob Brassel, Basel, Alfred Fasciati, Bottmingen, Raymond Gunst, Binningen, and Walter von Krannichfeldt, Arlesheim, Switzerland, assignors to Ciba Limited, Basel, Switzerland, a Swiss firm No Drawing. Filed Jan. 22, 1957, Ser. No. 635,081

Claims priority, application Switzerland Jan. 27, 1956

10 Claims. (Cl. 260—153)

This invention provides new dyestuffs, which contain both azo-chromophores and quinone chromophores, and which, like the dyestuff of the formula (1)
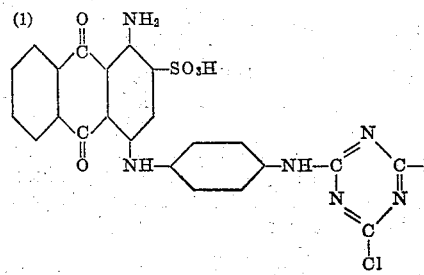

correspond to the general formula (2)
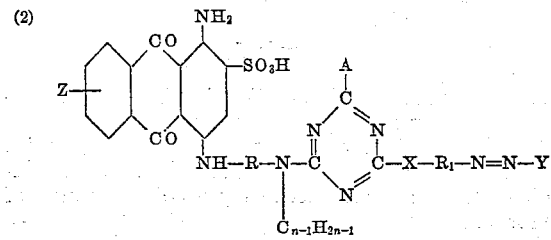

in which $n$ represents a whole number up to 3, R and $R_1$ each represent a benzene radical, X represents an amino bridge bound to $R_1$ in meta-position to the azo linkage, Y represents the radical of a heterocyclic keto-methylene compound which is bound to the azo linkage in a position vicinal to a keto group, Z represents a sulfonic acid group or a hydrogen atom, and A represents a halogen atom or an —NH$_2$ group or a radical bound to the carbon atom directly or through an oxygen or nitrogen bridge.

The invention also provides a process for the manufacture of the dyestuffs of the above Formula 2, wherein a di- or a trihalogen-1,3,5-triazine is condensed on the one hand with an anthraquinone dyestuff of the formula (3)
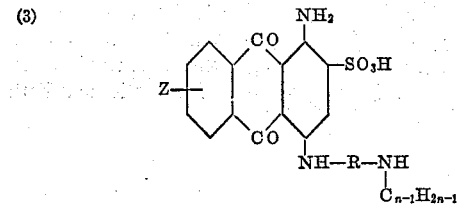

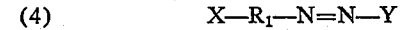

in which $n$ and Z have the meanings given above, and on the other hand with a monoazo-dyestuff of the formula (4)    X—$R_1$—N=N—Y in which $R_1$ and Y have the meanings given above and X represents an amino group capable of being acylated and bound to $R_1$ in a meta position relatively to the azo linkage, the halogen atom present in the obtained products of condensation being, if desired, replaced by an NH$_2$-group or by an organic radical.

As anthraquinone dyestuffs of the above kind which are used as starting materials in the present invention there may be mentioned more especially those which contain in the benzene nucleus R an amino group capable of being acylated, and especially an —NH$_2$ group. This amino group may be present in the meta-position or advantageously in para-position to the —NH— group, and the benzene nucleus may contain further substituents, such as alkyl groups or an —SO$_3$H group.

As examples of such anthraquinone dyestuffs there may be mentioned the following: 1-amino-4-(4'-aminophenylamino) - anthraquinone-2:3'-disulfonic acid, 1-amino-4-(4'-aminophenylamino)-anthraquinone-2:5- or -2:6- or -2:7- or -2:8-disulfonic acid, 1-amino-4-(4'-aminophenylamino)-anthraquinone-2:3':5- or -2:3':6- or -2:3':7- or -2:3':8-trisulfonic acid, 1 - amino - 4 - (3'-aminophenylamino)-anthraquinone-2:4'-disulfonic acid, and also those

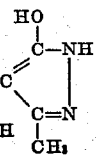

containing a single sulfonic acid group, such as 1-amino-4-(4'- or 3'-aminophenylamino)-anthraquinone-2-sulfonic acid, 1-amino-4-(3'-amino-4'- or -6'-methylphenylamino)-anthraquinone-2-sulfonic acid, 1 - amino-4-(4'-amino-3'-methylphenylamino)anthraquinone - 2 - sulfonic acid, 1-amino-4-(3'-amino-4':6'-dimethylphenylamino) - anthraquinone - 2 - sulfonic acid, 1-amino-4-(4'-aminophenylamino) - anthraquinone-3'-sulfonic acid diethylamide-2-sulfonic acid and 1-amino-4-(4'-aminophenylamino)-anthraquinone-3'-methylsulfone-2-sulfonic acid.

As monoazo-dyestuffs of the above Formula 4 there may be mentioned, for example, the monoazo-dyestuffs obtained by coupling barbituric acid or especially 5-pyrazolones capable of coupling in the 4-position with benzenic diazo compounds which contain in a meta-position to the diazo-grouping a free amino group or a substituent which may be converted into such an amino group. One mol of such an amino-azo-dyestuff may be condensed first with 1 mol of cyanuric chloride or with 1 mol of a dihalogen-triazine of the formula (6)
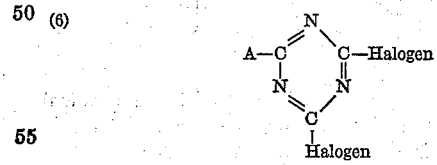

in which A represents an —NH$_2$ group or an organic radical not of dyestuff character, advantageously containing at most 12 carbon atoms, which is bound to the triazine nucleus directly or through an —O— or —NH— bridge, and then with one mol of an anthraquinone dyestuff of the Formula 3.

The dihalogen-triazines of the above constitution can be made by methods in themselves known from cyanuric halides, such as cyanuric bromide or cyanuric chloride, by reacting, for example, 1 mol of cyanuric chloride with 1 mol of an amino- or hydroxy-compound not having the character of a dyestuff. As such compounds there may be used ammonia, aliphatic or aromatic hydroxy-compounds, such as methyl alcohol, ethyl alcohol or butyl alcohol, phenol, ortho-, meta- or para-cresol, 4-secondary-butyl-phenol, 4-tertiary-amyl-phenol, dialkyl-phenols, para-chlorophenol and especially organic nitrogen compounds such as methylamine, dimethylamine, ethylamine, diethylamine, isopropylamine, butylamine, hexylamine, phenylamine, tolylamine, 4-chlorophenylamine, N-methylphenylamine or cyclohexylamine, and also β-chlorethylamine, methoxy-ethylamine, γ-methoxy-propylamine or ethanolamine. Suitable dihalogen-triazines of the above Formula 6 can also be obtained by methods in themselves known from 1 mol of cyanuric chloride and 1 mol of an alkyl-, cycloalkyl-, aralkyl-, or aryl-magnesium-halide.

The condensation of the resulting triazine dyestuffs containing mobile halogen atoms with the anthraquinone dyestuffs is carried out advantageously in the presence of an acid-binding agent such as sodium acetate, sodium hydroxide, or sodium carbonate and advantageously in an aqueous medium.

The invention also provides a modification of the aforesaid process for producing the dyestuffs of the Formula 2, wherein an anthraquinone dyestuff of the Formula 3 is condensed with a cyanuric halide, especially cyanuric chloride, or with a dihalogen-triazine of the Formula 6 in the molecular ratio 1:1, and the condensation product so obtained is further condensed with 1 molecular proportion of a dyestuff of the Formula 4.

When the condensation product so obtained still contains an exchangeable halogen atom it may be exchanged for one of the hydroxyl or amino compounds not having the character of a dyestuff which are referred to above in connection with the preparation of the dihalogen-triazines of the Formula 6.

All the condensations are advantageously carried out at a pH value within the range of 5-7. Depending on the starting materials used it may be of advantage to raise the pH value somewhat from stage to stage. It is generally desirable to maintain the pH-value as constant as possible during each stage, and this can be successfully carried out by continuously controlling and neutralizing the hydrohalic acid liberated, for example, by means of an alkali carbonate or alkali hydroxide.

The present invention thus provides inter alia dyestuffs of the formula

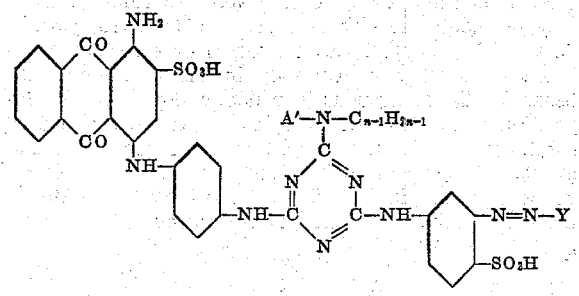

in which Y is the radical of barbituric acid or the radical of a 3-methyl-5-pyrazolone bound to the azo linkage in the 4-position, A' is a lower hydrocarbon radical containing at most 6 carbon atoms and is either lower alkyl or a mononuclear six-membered carbocyclic radical, and $n$ is a whole number up to 2, A' and Y being free from sulfonic acid groups.

Especially valuable and easily accessible are those dyestuffs of the Formula 2 which correspond to the formula

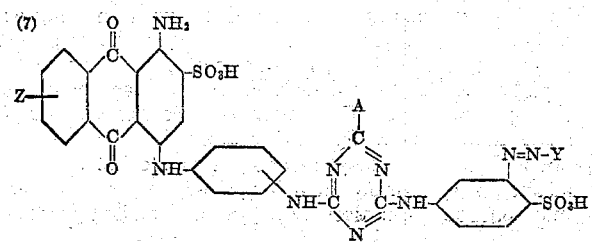

in which Z represents a sulfonic acid group or a hydrogen atom, A represents a chlorine atom or a substituent containing at most 12 carbon atoms which is bound to the triazine ring directly or advantageously through a nitrogen bridge, and Y represents the radical of barbituric acid or of a 3-methyl-5-pyrazolone bound in the 4-position to the azo linkage.

The dyestuffs of this invention are suitable for dyeing or printing a very wide variety of materials, such as polyhydroxylated textile materials, for example, of polyvinyl alcohol or of natural or regenerated cellulose, and nitrogenous textile materials such as silk, leather and above all wool, and also synthetic fibers of superpolyamides or superpolyurethanes. When the starting materials are so chosen that the dyestuff produced contains one or at most two sulfonic acid groups, the dyestuffs are suitable especially for dyeing nitrogenous textile materials from neutral or weakly acid baths, advantageously an acetic acid bath, of which the pH value is within the range of 5-7, and those dyestuffs of the invention which contain more than two sulfonic acid groups and a halogen atom in the triazine nucleus are especially suitable for dyeing cotton and polyhydroxylated materials. The latter dyestuffs, which contain a halogenated triazine nucleus and more than two sulfonic acid groups, can be applied to the fiber to be dyed by the direct dyeing method or by the printing or so-called padding process and fixed on the fiber by alkaline treatment. The dyeings and prints produced by these methods are distinguished by the especially good purity of their tints, by a good fastness to light and by excellent properties of wet fastness.

The following examples illustrate the invention, the parts and percentages being by weight, unless otherwise stated:

*Example 1*

8.18 parts of 1-amino-4-(4'-aminophenylamino)-anthraquinone-2-sulfonic acid are dissolved in 200 parts of water with the addition of 0.9 part of sodium hydroxide and 1.1 parts of sodium carbonate at 40° C. Into the resulting solution are introduced 9.8 parts of the dyestuff of the formula

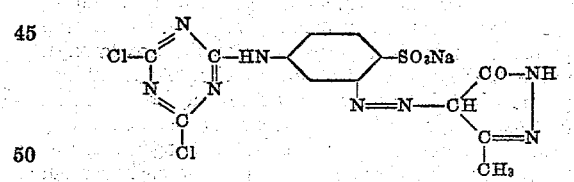

in the form of an aqueous paste of about 25% strength. The reaction mixture is stirred for 30 minutes at 35-40° C. and for 30 minutes at 45-50° C. The whole is then heated to 70° C. The resulting dyestuff is filtered off at that temperature and washed with 150 parts of sodium chloride solution of 2% strength. When dry it is a dark powder which dissolves in water with a green coloration and dyes wool from a neutral or weakly acetic acid bath clear green tints.

The dyestuff obtained as described above, advantageously without being dried, is boiled under reflux with 1000 parts of water and 3.8 parts of aniline for 6 hours. After the addition of 120 parts of a saturated solution of sodium chloride the mixture is stirred for 15 minutes. The dyestuff, which precipitates almost completely, is filtered off while hot. When dry it is a dark powder which dissolves in water with a green coloration and dyes wool from a neutral or weakly acetic acid bath clear green tints.

The azo dyestuff of the above formula used as starting material can be prepared, for example, as follows:

18.5 parts of cyanuric chloride are suspended in 400 parts of ice water, and 29.7 parts of a suspension of the dyestuff of the formula

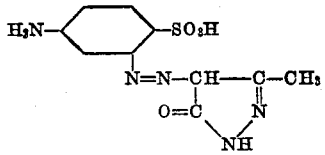

separated in the acid state (prepared by coupling diazotized 1-acetylamino-3-aminobenzene-4-sulfonic acid with 3-methyl-5-pyrazolone followed by hydrolysis of the acetylamino group) in 400 parts of water. There are introduced dropwise into the resulting yellow suspension in the course of 3 hours at 2–5° C., 10.6 parts of sodium carbonate dissolved in 100 parts of water. The color of the suspension shifts towards green-yellow. The condensation product is filtered off and condensed with 1-amino-4-(4′-aminophenylamino)-anthraquinone-2-sulfonic acid in the manner described above.

*Example 2*

39.3 parts of the secondary condensation product of 1 mol of cyanuric chloride, 1 mol of aniline and 1 mol of 1:3-diaminobenzene-4-sulfonic acid are suspended in 300 parts of water and 25 parts of hydrochloric acid of 30 percent strength, and diazotized at about 10–15° C. with 25 parts by volume of a 4 N-solution of sodium nitrite. To the resulting slightly yellow colored diazo-suspension there are added 30 parts of sodium acetate $(CH_3CO_2Na.3H_2O)$ and then there is slowly added at 10–15° C. a solution of 21.5 parts of 1-(2′-chlorophenyl)-3-methyl-5-pyrazolone in 104 parts by volume of a 1 N-solution of sodium hydroxide. When the coupling is finished the precipitated dyestuff is filtered off and washed with sodium chloride solution of 1% strength.

The product so obtained is stirred in the form of a moist paste with 1000 parts of water at 60° C., and a neutral solution of 40.9 parts of 1-amino-4-(4′-aminophenylamino)-anthraquinone-2-sulfonic acid in 500 parts of water at 60° C. is added. The whole is heated to 90–95° C. After a short time the mixture which is initially alkaline to brilliant yellow paper becomes acid to litmus. The hydrochloric acid formed is neutralized continuously with a dilute solution of sodium carbonate. After stirring the mixture for about 20 hours at 90–95° C. the reaction remains constantly neutral. The condensation is finished. After cooling the mixture ito 65° C., the green dyestuff formed is salted out with sodium chloride solution of 10% strength and filtered off. After drying, there is obtained in good yield a green dyestuff powder. The dyestuff dyes wool from a neurtal or acetic acid bath yellowish pure green tints having good properties of fastness.

In the following table are given in the second column the tints on wool produced by similar dyestuffs obtained by the above method by condensing the anthraquinone dyestuff of the formula

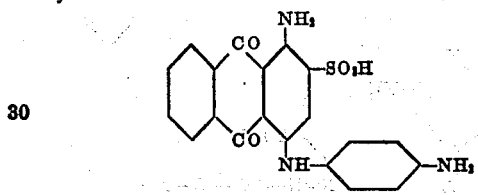

instead of the above-menitoned secondary condensation product, with those given in the first column of the table.

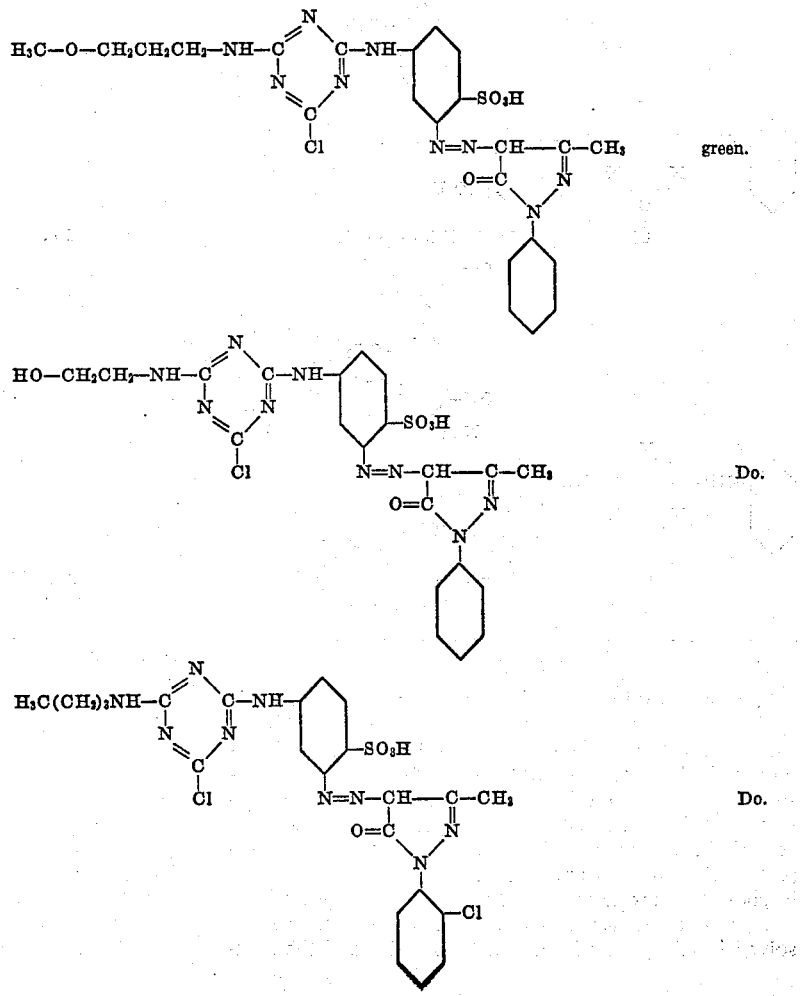

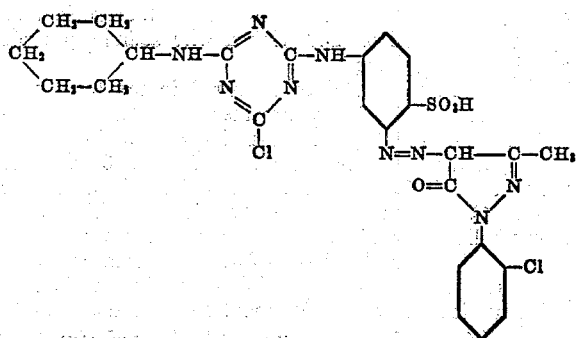 Green.

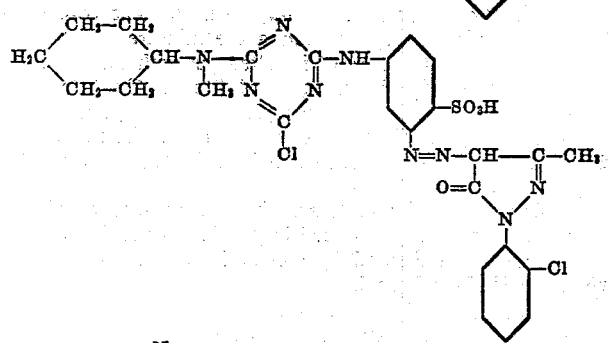 Do.

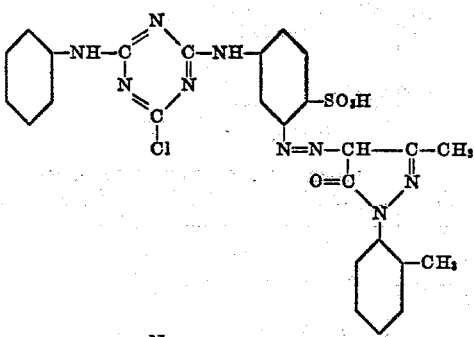 Do.

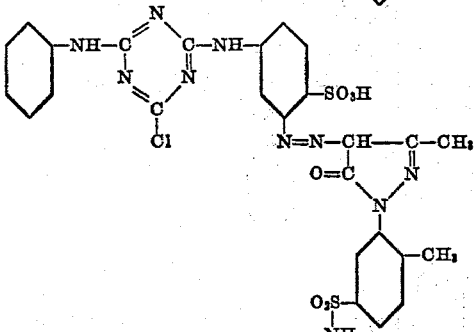 Do.

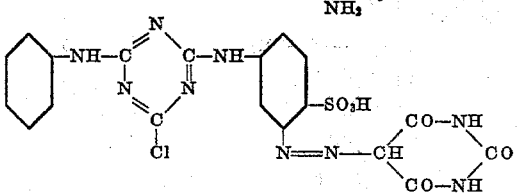 strong bluish green.

Example 3

23.0 parts of 1-acetylamino-3-aminobenzene-4-sulfonic acid are diazotized in known manner and coupled in an alkaline medium at 0–5° C. with 20.8 parts of 1-(2'-methyl-6'-chlorophenyl)-methyl-5-pyrazolone. The resulting yellow dyestuff is saponified with caustic soda solution at 90–95° C., and the resulting product is precipitated at 50° C. by making the reaction neutral to phenolphthalein. The mixture is filtered and there is obtained in good yield the expected yellow amino-azo-dyestuff.

45 parts of the amino-azo-dyestuff so obtained are dissolved in 650 parts of water at 60–70° C., and the solution is run into a suspension of 18.4 parts of cyanuric chloride in 200 parts of ice and 50 parts of water while stirring well. The temperature is maintained at 10–15° C. by the addition of ice. The whole is stirred for 4 hours at 10–15° C., during which the hydrochloric acid liberated is neutralized by the addition of a 1 N-solution of caustic soda.

40.9 parts of 1-amino-4-(4'-aminophenylamino)-anthraquinone-2-sulfonic acid are dissolved in 500 parts of water at 50° C. and rendered neutral with caustic soda solution, and added to the suspension of the cyanuric chloride monocondensate. The whole is heated to 40° C.

and stirred for 12 hours at that temperature, during which the hydrochloric acid liberated is continuously neutralized with a 1 N-solution of caustic soda. There are then added 18.0 parts of aniline, and the whole is heated to 90–95° C. and stirred for 2½ hours at that temperature. After cooling the mixture to 80° C. a quantity of sodium chloride amounting to 10% of the volume of the mixture, i.e. about 240 parts of sodium chloride, is added, the whole is stirred for a short time and then filtered. After drying the filter residue in vacuo at 90–95° C., there is obtained a green dyestuff powder in good yield, which has dyeing properties similar to those of the dyestuff obtained as described in Example 2.

Instead of 1-amino-4-(4'-aminophenylamino)-anthraquinone-2-sulfonic acid, there may be used 1-amino-4-(3'-aminophenylamino)-anthraquinone-2-sulfonic acid. The dyestuff obtained therefrom dyes wool duller and more olive tints than those of the above-mentioned dyestuff.

*Example 4*

5.2 parts of the dyestuff of the formula

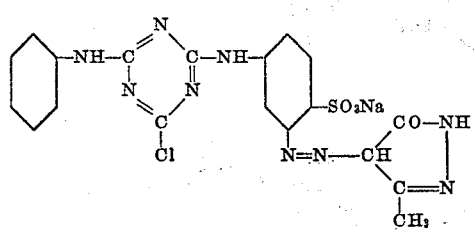

are stirred in 200 parts of water at 70° C. After the addition of a solution, heated at 40° C. of 4.09 parts of 1 - amino - 4 - (4' - aminophenylamino) - anthraquinone-2-sulfonic acid and 0.4 part of sodium hydroxide in 200 parts of water, the reaction mixture is boiled under reflux for 24 hours, during which the reaction is constantly maintained neutral to litmus by the addition of dilute sodium carbonate solution. After the addition of 60 parts of a saturated solution of sodium chloride, the whole is stirred for 15 minutes. The precipitated dyestuff is filtered off at 50–55° C. and washed with 200 parts of sodium chloride solution of 5 percent strength. When dry it is a dark powder which dissolves in water with a green coloration and dyes wool from neutral or weakly acetic acid baths clear green tints.

Similarly good results can be obtained by using, instead of the azo-dyestuff of the above formula, the following dyestuffs:

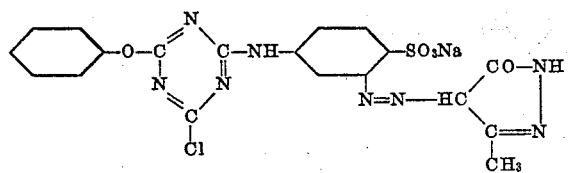

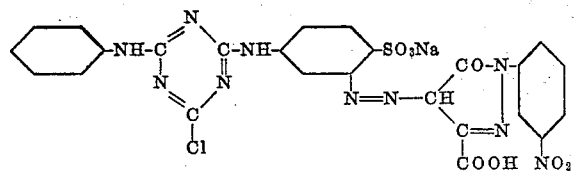

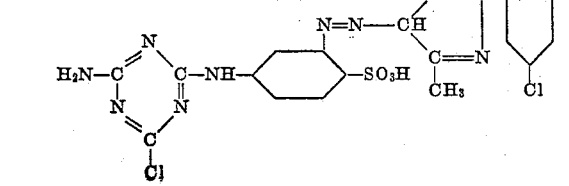

*Example 5*

18.5 parts of cyanuric chloride are finely suspended in 600 parts of ice and 200 parts of water. A neutral solution of 18.8 parts of 1:3-diaminobenzene-4-sulfonic acid in 400 parts of water is added. The hydrochloric acid liberated is neutralized with 100 parts of a 1 N-solution of sodium hydroxide in such manner that the pH value does not exceed 6.5. After 15 minutes at 0° C. the condensation is finished. The pH value is adjusted to 8.5 by the addition of a dilute solution of sodium hydroxide, 25 parts of a 4 N-solution of sodium nitrite are added and the solution so obtained is run in the course of 15 minutes into 60 parts by volume of a solution containing substantially 30 percent of naphthalene-1-sulfonic acid. The whole is stirred for 2 hours at 20° C. and 12.8 parts of barbituric acid in 400 parts of water and 200 parts of sodium carbonate solution of 10% strength are run in in the form of a fine stream at 20° C. When the coupling is finished the dyestuff is precipitated with sodium chloride and filtered off. It is suspended in 1000 parts of water at 20° C., a neutral solution of the disodium salt of 1-amino-4-(4'-aminophenylamino)-2:3'-disulfonic acid in 500 parts of water at 60° C. is added, and the condensation is carried out for 24 hours at 40–45° C. at a pH value of 6.5. The mixture is finally rendered alkaline by the addition of 5 parts of sodium carbonate, and the dyestuff is precipitated by the addition of 10 parts by volume of a saturated solution of sodium chloride, filtered off and dried.

The dyestuff dyes cellulose fibers from an alkaline bath containing a salt or by the so-called pad dyeing process and subsequent fixation with alkali fast bluish green tints.

*Example 6*

A solution of 0.02 mol of the disodium salt of 1-amino - 4 - (4' - aminophenylamino) - anthraquinone-2:3'-disulfonic acid in 400 cc. of cold water is cooled to 0° C., and then a solution of 3.8 grams of cyanuric chloride in 20 cc. of acetone is added. The mixture is stirred for 30–60 minutes at 0–5° C., during which the acid liberated is continuously neutralized by the addition of a dilute solution of sodium hydroxide. When the condensation is finished a neutral solution of 0.02 mol of the dyestuff of the formula

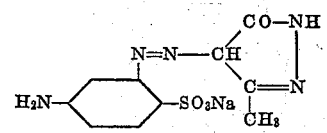

in 400 cc. of water is added. The mixture is warmed to 35° C. and stirred for about 7 hours at 35–40° C., during which the acid liberated is continuously neutralized by the addition of a dilute solution of sodium hydroxide. The green dyestuff so obtained is precipitated by the addition of sodium chloride and filtered off. When dry it is a dark powder which dissolves in water with a green coloration and dyes cellulose by the dyeing process described in Example 8 green tints which are very fast to washing and light.

The yellow dyestuff of the above formula used as intermediate product can be prepared in known manner by diazotizing 4-acetylamino-2-aminobenzene-1-sulfonic acid, coupling the diazo compound with 3-methyl-pyrazolone-(5), and then hydrolysing the acetylamino group with dilute hydrochloric acid.

The above dyestuff, which dyes cellulose green tints, can also be prepared by first reacting 1 mol of the yellow dyestuff of the above formula with 1 mol of cyanuric chloride and then condensing the yellow primary condensation product so obtained with 1 mol of 1-amino-4 - (4' - aminophenylamino) - anthraquinone - 2:3' - disulfonic acid. The yellow primary condensation product can also be prepared by diazotizing the condensation product of 1 mol of 1:3-diaminobenzene-4-sulfonic acid with 1 mol of cyanuric chloride and then coupling the diazo compound with 3-methyl-5-pyrazolone.

The blue and yellow components mentioned in the following table can be condensed in an analogous manner to form dyestuffs which dye cellulose the tints given in the fourth column of the table, which tints are very fast to washing and light.

| No. | Blue Component | Yellow Component | Tint |
|---|---|---|---|
| 1 | (structure) | (structure) | Green. |
| 2 | (structure) | (structure) | Do. |
| 3 | (structure) | (structure) | Do. |
| 4 | (structure) | (structure) | Do. |
| 5 | (structure) | (structure) | Do. |
| 6 | (structure) | (structure) | Do. |
| 7 | (structure) | (structure) | Do. |

| No. | Blue Component | Yellow Component | Tint |
|---|---|---|---|
| 8 | 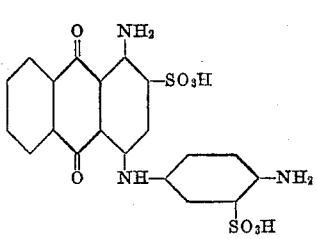 | 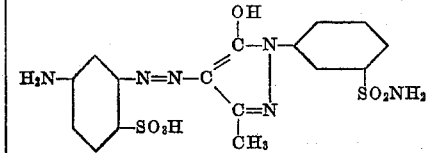 | Green. |
| 9 | 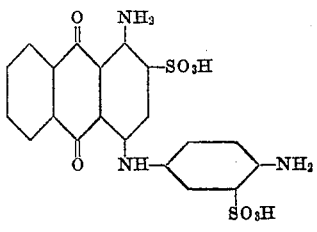 | 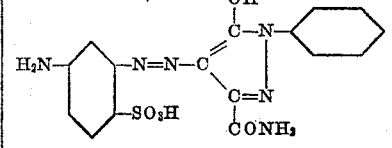 | Do. |
| 10 | 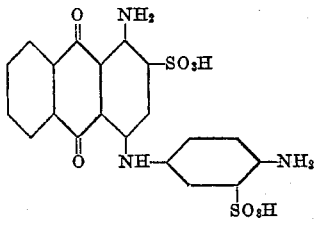 | 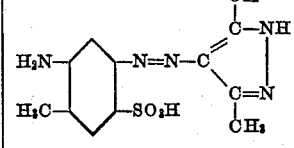 | Do. |
| 11 | 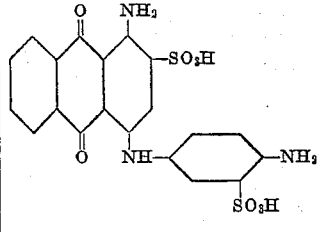 | 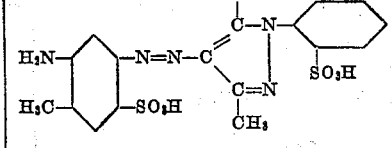 | Do. |
| 12 | 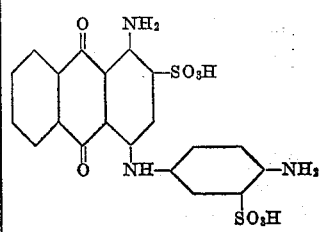 | 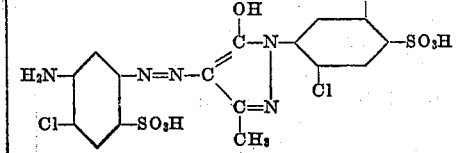 | Do. |
| 13 | 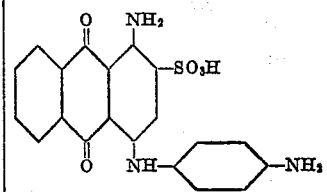 | 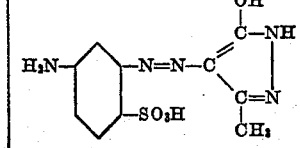 | Do. |
| 14 | 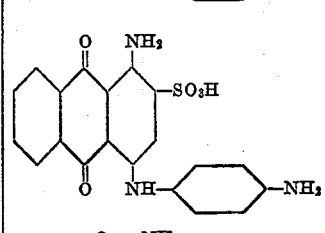 | 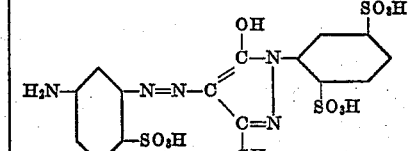 | Do. |
| 15 | 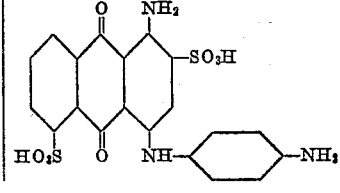 | 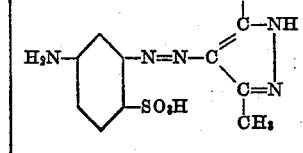 | Do. |

| No. | Blue Component | Yellow Component | Tint |
|---|---|---|---|
| 16 | (anthraquinone derivative with NH₂, SO₃H, HO₃S, O, NH–C₆H₄–NH₂) | H₂N–C₆H₄(SO₃H)–N=N–C(OH)=C–N(C₆H₄NO₂)–N=C–COOH (pyrazolone) | Green. |
| 17 | (anthraquinone with HO₃S, NH₂, SO₃H, O, NH–C₆H₄–NH₂) | H₂N–C₆H₄(SO₃H)–N=N–C(OH)=C–N(C₆H₃Cl₂SO₃H)–N=C–CH₃ | Do. |
| 18 | (anthraquinone with NH₂, SO₃H, HO₃S, O, NH–C₆H₃(SO₃H)–NH₂) | H₂N–C₆H₄(SO₃H)–N=N–C(OH)=C–NH–N=C–CH₃ | Do. |
| 19 | (anthraquinone with NH₂, SO₃H, HO₃S, O, NH–C₆H₃(SO₃H)–NH₂) | H₂N–C₆H₄(SO₃H)–N=N–C(OH)=C–N(C₆H₄NO₂)–N=C–CH₃ | Do. |
| 20 | (anthraquinone with HO₃S, NH₂, SO₃H, O, NH–C₆H₃(SO₃H)–NH₂) | H₂N–C₆H₄(SO₃H)–N=N–C(OH)=C–N(C₆H₄Cl)–N=C–CH₃ | Do. |
| 21 | (anthraquinone with HO₃S, NH₂, SO₃H, O, NH–C₆H₃(SO₃H)–NH₂) | H₂N–C₆H₄(SO₃H)–N=N–C(OH)=C–N(C₆H₄SO₃H)–N=C–CH₃ | Do. |
| 22 | (anthraquinone with NH₂, SO₃H, O, NH–C₆H₄–NH₂) | H₂N–C₆H₄(SO₃H)–N=N–C(OH)=C–NH–N=C–CH₃ | Olive green. |
| 23 | (anthraquinone with NH₂, SO₃H, O, NH–C₆H₃(NH₂)–SO₃H) | H₂N–C₆H₄(SO₃H)–N=N–C(OH)=C–NH–N=C–CH₃ | Do. |

| No. | Blue Component | Yellow Component | Tint |
|---|---|---|---|
| 24 | (anthraquinone with NH₂, SO₃H, NH-phenyl-NH₂-SO₃H) | H₂N-phenyl(SO₃H)-N=N-C(OH)=C-N(phenyl-SO₃H)-N=C-CH₃ | Olive green. |
| 25 | (anthraquinone with NH₂, SO₃H, NH-phenyl-NH₂-SO₃H) | H₂N-phenyl(SO₃H)-N=N-C(OH)=C-N(phenyl-SO₂NH₂)-N=C-CH₃ | Do. |
| 26 | (anthraquinone with NH₂, SO₃H, NH-phenyl-NH₂-Cl) | H₂N-phenyl(SO₃H)-N=N-C(OH)=C-NH-N=C-CH₃ | Do. |
| 27 | (anthraquinone with NH₂, SO₃H, NH-phenyl-NH₂-Cl) | H₂N-phenyl(SO₃H)-N=N-C(OH)=C-N(phenyl-SO₃H,SO₃H)-N=C | Do. |
| 28 | (anthraquinone with NH₂, SO₃H, NH-phenyl-NH₂-CH₃) | H₂N-phenyl(SO₃H)-N=N-C(OH)=C-NH-C(CH₃)=N | Do. |
| 29 | (anthraquinone with NH₂, SO₃H, NH-phenyl-NH₂-CH₃-CH₃) | H₂N-phenyl(SO₃H)-N=N-C(OH)=C-NH-C(CH₃)=N | Do. |
| 30 | (anthraquinone with NH₂, SO₃H, NH-phenyl-CH₃-NH₂-CH₃) | H₂N-phenyl(SO₃H)-N=N-C(OH)=C-NH-C(CH₃)=N | Do. |
| 31 | (anthraquinone with NH₂, SO₃H, NH-phenyl-CH₃-NH₂-CH₃) | H₂N-phenyl(SO₃H)-N=N-C(OH)=C-NH-C(CH₃)=N | Green. |

| No. | Blue Component | Yellow Component | Tint |
|---|---|---|---|
| 32 | (anthraquinone with NH₂, SO₃H, NH—C₆H₄—NH.CH₃) | H₂N—C₆H₃(SO₃H)—N=N—C(OH)=C(—C(=N—CH₃)—)—N—C₆H₃(Cl)(CH₃)—SO₃H | Green. |
| 33 | (anthraquinone with NH₂, SO₃H, NH—C₆H₄—NH.CH₃) | H₂N—C₆H₃(SO₃H)—N=N—C(OH)=C(—C(=N—CH₃)—)—N—C₆H₃Cl₂—SO₃H | Do. |
| 34 | (anthraquinone with NH₂, SO₃H, HO₃S—, NH—C₆H₄—NH.C₂H₅) | H₂N—C₆H₃(SO₃H)—N=N—C(OH)=C(—C(=N—CH₃)—)—N—C₆H₂Cl₂—SO₃H | Do. |
| 35 | (anthraquinone with NH₂, SO₃H, HO₃S—, NH—C₆H₄—NH₂) | H₂N—C₆H₃(SO₃H)—N=N—C(OH)=C(—C(=N—CH₃)—)—N—C₆H₃(Cl)₂—SO₃H | Do. |

Example 7

2 parts of the dyestuff obtained as described in Example 1 are dissolved in 4000 parts of water, 10 parts of crystalline sodium sulfate are added to the dyebath, and 100 parts of wool are entered at 40–50° C. There are then added 2 parts of acetic acid of 40 percent strength, the bath is raised to the boil in the course of ½ hour, and dyeing is carried on for ¾ hour at that temperature. After rinsing and drying the material, there is obtained a green dyeing which is very fast to washing and fulling.

The same result is obtained when the dyebath contains no acetic acid or when superpolyamide fibers are dyed, instead of wool.

Example 8

1 part of the dyestuff obtained as described in the first paragraph of Example 6, is mixed with 9 parts of urea and dissolved in 100 parts of water. A cotton fabric is impregnated with the resulting solution at 80° C. on the foulard, and then the excess liquid is squeezed off until the material retains 75% of its weight of dyestuff solution.

The impregnated fabric is dried, then impregnated at room temperature in a solution which contains, per liter, 10 grams of sodium hydroxide and 300 grams of sodium chloride, the fabric is squeezed until it retains 75 percent of its weight of liquid, and is then steamed for 60 seconds at 100–101° C. It is then rinsed, treated in a solution of sodium bicarbonate of 0.5 percent strength, rinsed again, soaped for ¼ hour in a solution of 0.3 percent strength of an ion-free detergent at the boil, rinsed and dried.

There is obtained a dyeing which is fixed fast to boiling.

A similar good result is obtained by using, instead of the cotton fabric, a fabric of staple fibers of regenerated cellulose.

A similar good result is also obtained by carrying out the impregnation with the dyestuff solution at a temperature of 30° C. instead of 80° C.

What is claimed is:

1. A dyestuff which in its free acid state corresponds to the general formula

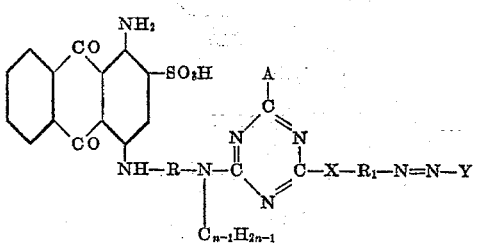

wherein R represents a benzene radical and $R_1$ represents a benzene sulfonic acid radical with the sulfonic acid group in ortho position to the azo nitrogen, X represents a nitrogen bridge bound to $R_1$ in meta-position to the azo linkage, Y represents the radical of a heterocyclic ketomethylene compound containing two nitrogen atoms as hetero atoms and being bound to the azo linkage in a position vicinal to a keto group and A represents a member selected from the group consisting of a chlorine atom, an $H_2N$-group, a methoxy group, a phenoxy group and the radical of an organic monoamine having at most 7 carbon atoms and being bound through its amino group, and $n$ represents a whole number up to 3.

2. A dyestuff which in its free acid state corresponds to the formula

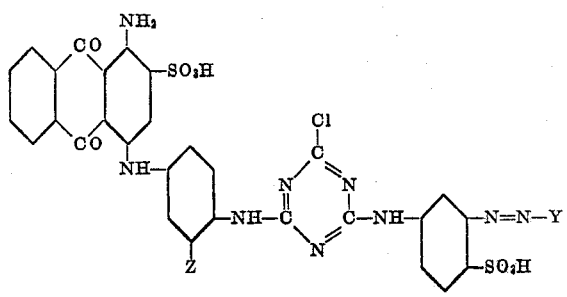

wherein Z represents a member selected from the group consisting of a sulfonic acid group and a hydrogen atom and Y represents a member of the group consisting of the radical of barbituric acid and the radical of a 3-methyl-5-pyrazolone bound to the azo linkage in the 4-position.

3. A dyestuff which in its free acid state corresponds to the formula

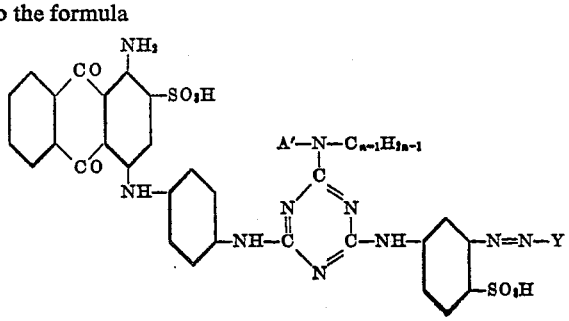

wherein Y represents a member of the group consisting of the radical of barbituric acid and the radical of a 3-methyl-5-pyrazolone bound to the azo linkage in the 4-position, A' represents a lower hydrocarbon radical containing at most 6 carbon atoms and selected from the group consisting of lower alkyl groups and mononuclear six-membered carbocyclic rings, and $n$ is a whole number up to 2, A' and Y being free from sulfonic acid groups.

4. The dyestuff which in its free acid state corresponds to the formula

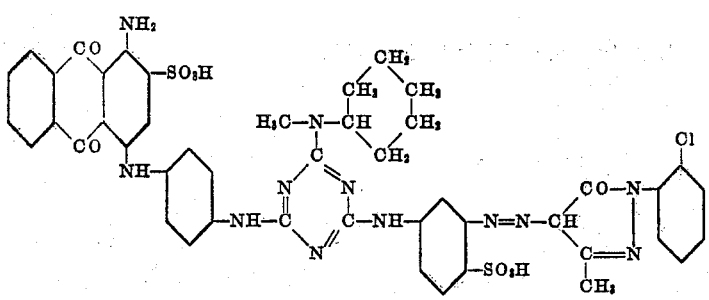

5. The dyestuff which in its free acid state corresponds to the formula

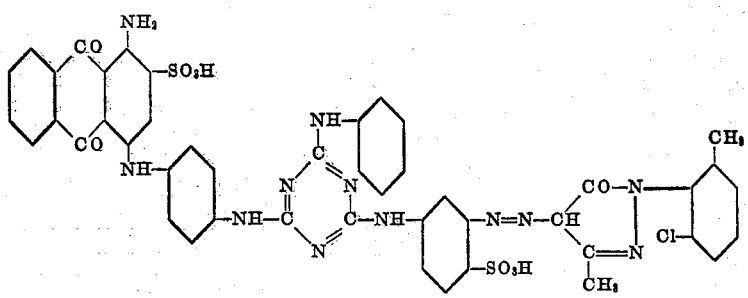

6. The dyestuff which in its free acid state corresponds to the formula

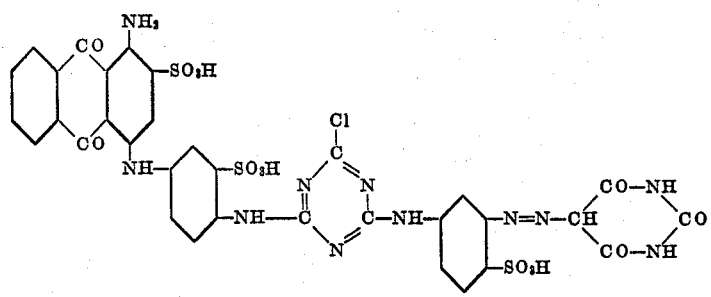

7. The dyestuff which in its free acid state corresponds to the formula

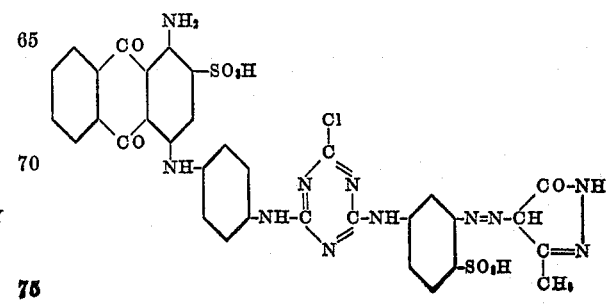

8. The dyestuff which in its free acid state corresponds to the formula

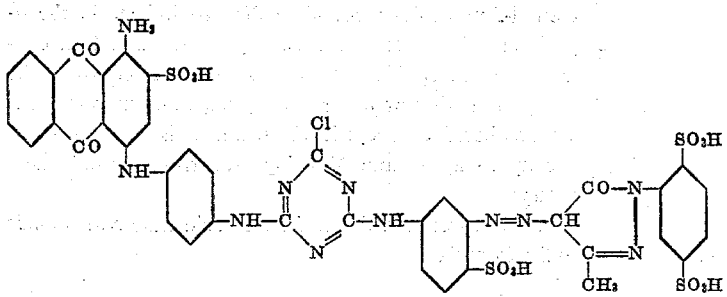

9. A dyestuff which in its free acid state corresponds to the formula

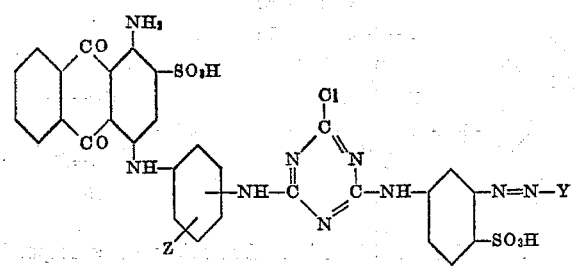

wherein Z represents a member selected from the group consisting a sulfonic acid group and a hydrogen atom, and Y represents the radical of a heterocyclic ketomethylene compound containing two nitrogen atoms as hetero atoms and being bound to the azo linkage in a position vicinal to a keto group.

10. A dyestuff which in its free acid state corresponds to the formula

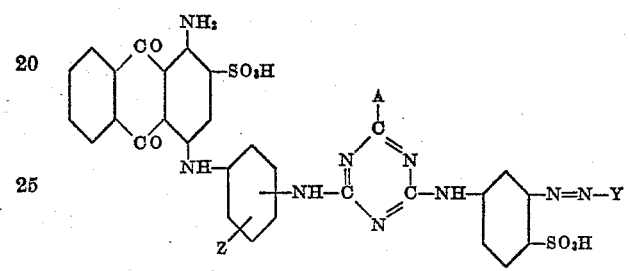

wherein Z represents a member selected from the group consisting of a sulfonic acid group and a hydrogen atom, A represents lower alkylamino bound through its amino group, and Y represents the radical of a heterocyclic ketomethylene compound containing two nitrogen atoms as hetero atoms and being bound to the azo linkage in a position vicinal to a keto group.

References Cited in the file of this patent

UNITED STATES PATENTS

| | | |
|---|---|---|
| 2,795,576 | Fasciati | June 11, 1957 |
| 2,853,482 | Gunot | Sept. 23, 1958 |

FOREIGN PATENTS

| | | |
|---|---|---|
| 740,660 | Great Britain | Nov. 16, 1955 |